(12) United States Patent
Kumai

(10) Patent No.: US 9,164,307 B2
(45) Date of Patent: Oct. 20, 2015

(54) POLARIZER, POLARIZER PRODUCING PROCESS, PROJECTOR, LIQUID CRYSTAL DEVICE, AND ELECTRONIC DEVICE

(71) Applicant: SEIKO EPSON CORPORATION, Tokyo (JP)

(72) Inventor: Yoshitomo Kumai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 131 days.

(21) Appl. No.: 13/673,252

(22) Filed: Nov. 9, 2012

(65) Prior Publication Data

US 2013/0120672 A1 May 16, 2013

(30) Foreign Application Priority Data

Nov. 14, 2011 (JP) ................. 2011-248285

(51) Int. Cl.
*G02F 1/1335* (2006.01)
*G02B 5/30* (2006.01)
*G02B 27/28* (2006.01)

(52) U.S. Cl.
CPC ............... *G02F 1/1335* (2013.01); *G02B 5/30* (2013.01); *G02B 5/3058* (2013.01); *G02F 1/133528* (2013.01); *G02F 2001/133548* (2013.01)

(58) Field of Classification Search
CPC .. G02B 5/30; G02B 5/3058; G02F 1/133528; G02F 1/1335; G02F 2001/133548

USPC ................. 349/5, 96; 359/483.01, 485.05
See application file for complete search history.

(56) References Cited

U.S. PATENT DOCUMENTS

| | | | |
|---|---|---|---|
| 7,233,563 B2 | 6/2007 | Ueki et al. | |
| 2004/0264350 A1* | 12/2004 | Ueki et al. | 369/112.16 |
| 2008/0044741 A1 | 2/2008 | Sarma et al. | |
| 2009/0322698 A1* | 12/2009 | Hirakata et al. | 345/173 |
| 2010/0225886 A1 | 9/2010 | Kumai | |
| 2010/0283052 A1 | 11/2010 | Sarma et al. | |
| 2011/0133216 A1 | 6/2011 | Sugawara | |
| 2012/0013884 A1 | 1/2012 | Sarma et al. | |

FOREIGN PATENT DOCUMENTS

| | | |
|---|---|---|
| JP | 2005-37900 | 2/2005 |
| JP | 2008-096973 | 4/2008 |
| JP | 2009-186929 | 8/2009 |
| JP | 2009186929 A * | 8/2009 |
| JP | 2010-210706 | 9/2010 |
| JP | 2010-530994 | 9/2010 |
| JP | 2011-124311 | 6/2011 |
| JP | 2011-227518 | 11/2011 |
| WO | 2008-084856 | 7/2008 |
| WO | 2009-002791 | 12/2008 |

* cited by examiner

*Primary Examiner* — Nathanael R Briggs
(74) *Attorney, Agent, or Firm* — Workman Nydegger

(57) ABSTRACT

A polarizer includes a first grating and a second grating. The second grating contains at least one of chromium nitride, tungsten nitride, and tantalum nitride.

21 Claims, 4 Drawing Sheets

POLARIZER, POLARIZER PRODUCING PROCESS, PROJECTOR, LIQUID CRYSTAL DEVICE, AND ELECTRONIC DEVICE

BACKGROUND

1. Technical Field

The present invention relates to polarizers, methods of production thereof, projectors, liquid crystal devices, and electronic devices.

2. Related Art

Wire grid polarizers are known as a type of polarizer. The wire grid polarizer is configured to include a metallic grid overlaid on a transparent substrate in a pitch shorter than the wavelengths of the light used. Because the wire grid polarizer can be realized using only inorganic materials, deterioration due to photoirradiation occurs much less frequently than in polarizing plates that use organic materials. The wire grid polarizer has thus attracted interest as an effective device in liquid crystal projectors of ever increasing brightness.

Despite the excellent heat resistance of the wire grid polarizer, there is a demand for improved high-temperature reliability in the face of the increasing brightness of liquid crystal projectors.

JP-A-2005-37900 discloses that a polarizer having high contrast and excellent light use efficiency can be provided by lamination of a high-reflection grating layer and a high-absorption grating layer on a substrate. The photoabsorptive thin film disclosed in this publication uses high-melting-point materials such as tungsten, chromium, and molybdenum. However, oxidation resistance is poor, and the film is not suited for actual use in a high-temperature environment of 300° C. or higher.

JP-A-2009-186929 describes using carbon, carbides, oxides, sulfides, or nitrides as the preferred light use efficiency light absorbing material in terms of improving photoabsorbability. Specifically, a polarizer is disclosed in which aluminum oxide, iron oxide, nickel oxide, copper oxide, vanadium oxide, and chromium oxide are used as light absorbing materials. Metal oxides are among the materials having the highest oxidation resistance under a high-temperature environment. However, the attenuation coefficients k of the metal oxides described in the examples of JP-A-2009-186929 are very small in the visible range, and are not suited for practical applications. The attenuation coefficient k is the imaginary part of the complex refractive index $N = n + ik$. Other than oxides, the publication discloses carbides, sulfides, and nitrides as examples of the light absorbing material. However, a specific composition is not disclosed, and the publication is silent as to the optical absorption characteristics of these materials, and the oxidation resistance in a high-temperature environment.

SUMMARY

An advantage of some aspects of the invention is to provide a polarizer having excellent high-temperature reliability, and a producing process thereof.

An aspect of the invention is directed to a polarizer that includes: a substrate; a first grating provided on the substrate and that is stripe-shaped in planar view; and a second grating provided on the substrate and that is stripe-shaped in planar view, and that extends in the extension direction of the first grating, the first grating being made of a light reflecting material, and the second grating containing at least one of chromium nitride, tungsten nitride, and tantalum nitride.

With this configuration, because the second grating has high oxidation resistance, an absorptive polarizer can be realized that has excellent high-temperature reliability and a desirable absorption characteristic.

According to one preferred aspect of the polarizer, the first grating and the second grating may form a laminate.

With this configuration, the first grating and the second grating can be simultaneously patterned, and the producing process can be simplified.

According to one preferred aspect of the polarizer, the polarizer may further include a dielectric layer between the first grating and the second grating.

With this configuration, interdiffusion between the constituent element of the first grating and the constituent element of the second grating can be prevented between the first grating and the second grating. It is therefore possible to suppress fluctuations of the polarization separation characteristic due to the interdiffusion.

According to one preferred aspect of the polarizer, the pitch of the first grating and the pitch of the second grating may be shorter than the wavelengths of visible light.

With this configuration, a polarizer can be realized that has high contrast, and excellent light use efficiency.

Another aspect of the invention is directed to a process for producing a polarizer that includes a substrate; a first grating provided on the substrate and that is stripe-shaped in planar view; and a second grating provided on the substrate and that is stripe-shaped in planar view, and that extends in the extension direction of the first grating, the process including generating the second grating by reaction in a nitrogen atmosphere.

With this producing process, a second grating having excellent oxidation resistance can easily be formed. It is therefore possible to easily produce a polarizer having excellent high-temperature reliability and a desirable absorption characteristic.

According to one preferred aspect of the polarizer producing process, the second grating may contain at least one of chromium nitride, tungsten nitride, and tantalum nitride.

With this producing process, a polarizer having even higher oxidation resistance can be produced.

Still another aspect of the invention is directed to a projector that includes: an illumination optical system that emits light; a liquid crystal light valve that modulates the light; and a projection optical system with which the light modulated by the liquid crystal light valve is projected onto a target projection surface, wherein the polarizer is provided between the liquid crystal light valve and the illumination optical system, and/or between the liquid crystal light valve and the projection optical system.

With this configuration, a projector can be provided that includes the polarizer having excellent high-temperature reliability.

Yet another aspect of the invention is directed to a liquid crystal device that includes: a liquid crystal layer between a pair of substrates; and the polarizer on the liquid crystal layer side of at least one of the pair of substrates.

With this configuration, a liquid crystal device can be provided that includes the polarizer having excellent high-temperature reliability.

Still yet another aspect of the invention is directed to an electronic device that includes the liquid crystal device.

With this configuration, an electronic device can be provided that includes a display section having excellent high-temperature reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1A:
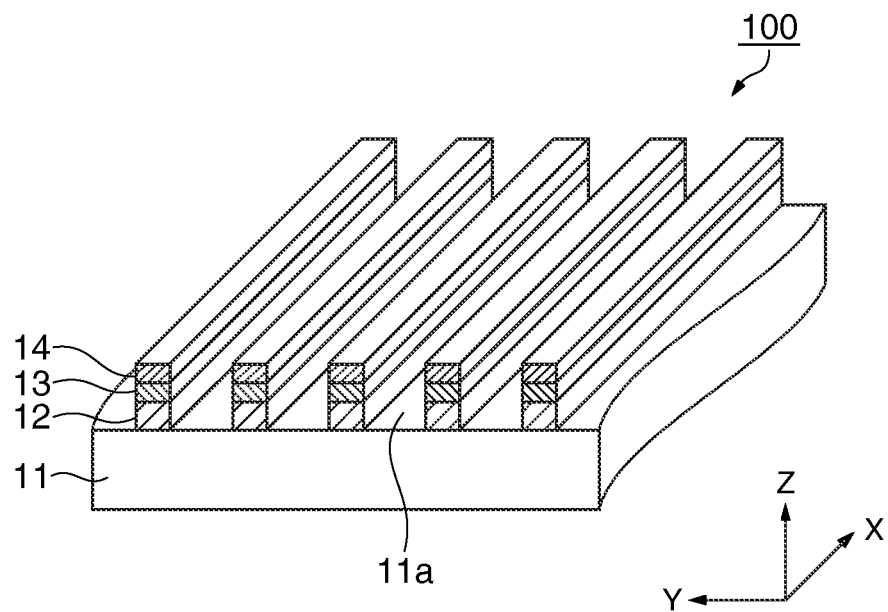
FIGS. 1A and 1B are schematic diagrams of a polarizer of First Embodiment.
Figure 1B:
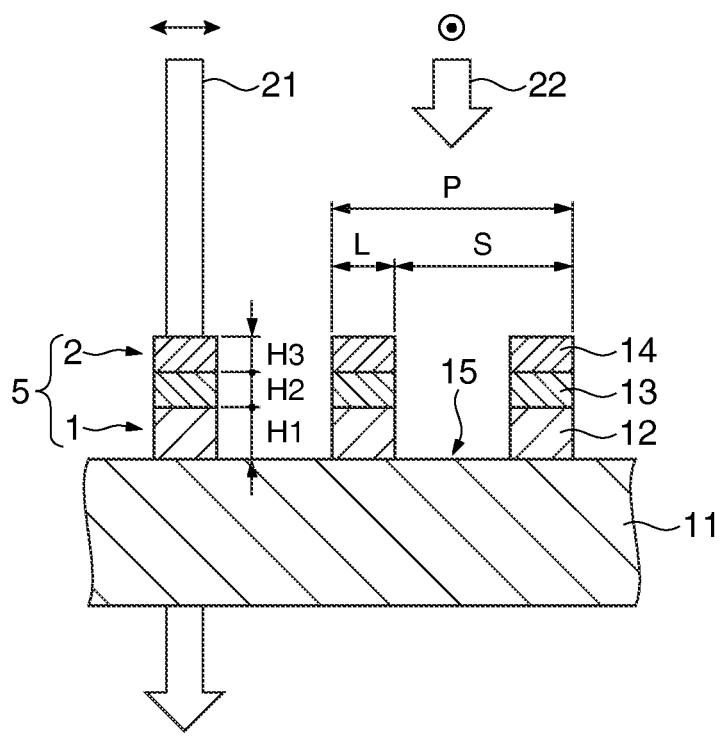

A polarizer and a polarizer producing process according to an embodiment of the invention are described below with reference to the accompanying drawings. FIGS. 1A and 1B are schematic diagrams of a polarizer 100 of the present embodiment. FIG. 1A is a partial perspective view, and FIG. 1B is a partial cross sectional view of the polarizer 100 at the YZ plane.

In the following, the positional relationships between different members will be described with reference to an XYZ Cartesian coordinate system set herein for the purpose of explanation. The plane parallel to a surface 11a of a substrate 11 is defined as an XY plane, and the extension direction of stripe-shaped metal layers 12 of a first grating is defined as an X-axis direction. The direction along which the plurality of metal layers 12 is aligned (aligned direction) is a Y-axis direction. In the all drawings, the proportions of the thicknesses and the dimensions of the constituting members are appropriately varied for viewability.

Polarizer

As illustrated in FIGS. 1A and 1B, the polarizer 100 includes the substrate 11, a first grating 1 provided on the substrate 11 and that is stripe-shaped in planar view, and a second grating 2 provided on the substrate 11 and that is stripe-shaped in planar view. The first grating 1 includes the plurality of stripe-shaped metal layers 12. The second grating 2 includes a plurality of stripe-shaped absorption layers 14 that extends in a direction parallel to the extension direction of the metal layers 12. The first grating 1 and the second grating 2 form a laminate 5, and dielectric layers 13 are provided between the metal layers 12 and the absorption layers 14.

The substrate 11 may be made of translucent material, and, for example, quartz and plastic may be used. The substrate 11 is a glass substrate in the present embodiment. Preferably, high heat-resistant glass or quartz is used as the material of the substrate 11, because the polarizer 100 may accumulate heat and generate high temperature depending on use.

The metal layers 12 are thin metallic wires that extend along a predetermined direction on the substrate 11. The metal layers 12 are aligned parallel to one another at a predetermined pitch on the substrate 11. The metal layers 12 are disposed at substantially the same intervals along the Y-axis direction in a period shorter than the wavelengths of visible light. In this way, the first grating serves as a polarizer for visible light. Materials having high light reflectance in the visible range are used for the metal layers 12. Specifically, for example, materials such as aluminum, silver, copper, chromium, titanium, nickel, tungsten, and iron may be used as the material of the metal layers 12. In the present embodiment, aluminum is used as the material of the metal layers 12.

The dielectric layers 13 are laminated on the metal layers 12, and the dielectric layers 13 are aligned parallel to one another on the substrate 11 at a predetermined pitch, as with the metal layers 12. The dielectric layers 13 are provided between the first grating 1 and the second grating 2. The dielectric layers 13 serve as a barrier layer for preventing the interdiffusion of the constituent elements of the metal layers 12 and the absorption layers 14 between the absorption layers 14 and the metal layers 12, as will be described later. By the provision of the dielectric layers 13, the metal layers 12 can be prevented from undergoing property changes, thereby preventing the polarization separation function from fluctuating.

The material of the dielectric layers 13 is not particularly limited, as long as dielectric materials that serve as a barrier are used. For example, the dielectric layers 13 may be formed of nitrides and oxides of silicon, aluminum, chromium, titanium, nickel, and tungsten. In the present embodiment, silicon oxide is used as the material of the dielectric layers 13.

The absorption layers 14 are laminated on the dielectric layers 13. The absorption layers 14 are aligned parallel to one another on the substrate 11 at a predetermined pitch, as with the metal layers 12. The absorption layers 14 extend along the extension direction (X-axis direction) of the metal layers 12. Metal nitrides having high absorbance in the visible region are used as the material of the absorption layers 14. Specifically, the absorption layers 14 contain at least one of chromium nitride, tungsten nitride, and tantalum nitride. In the present embodiment, chromium nitride is used as the material of the absorption layers 14.

Grooves 15 are provided between the adjacently disposed two metal layers 12. The grooves 15 are disposed at substantially the same intervals along the Y-axis direction in a period shorter than the wavelengths of visible light, as with the metal layers 12.

The dimensions of the different parts of the polarizer 100 of the present embodiment may be set as follows, for example. The metal layers 12 has a height H1 ranging from 50 nm to 200 nm, and the height H2 of the dielectric layers 13 on the metal layers 12 ranges from 10 nm to 50 nm. The height H3 of the absorption layers 14 on the dielectric layers 13 ranges from 10 nm to 50 nm. The interval S (the width of the grooves 15 along the Y-axis direction) between the adjacently disposed two metal layers 12 is 83 nm, and the period P (pitch) is 145 nm. The metal layers 12, the dielectric layers 13, and the absorption layers 14 have the same width L, specifically 62 nm.

In the polarizer 100 of the present embodiment described above, the metal layers 12 are formed of aluminum having high light reflectance in the visible range, and the dielectric layers 13 are formed of silicon oxide having high light transmittance in the visible range. The absorption layers 14 are formed of chromium nitride having high light absorbance in the visible region. The polarizer 100 of the present embodiment configured as above can have the following advantages.

First, by the provision of the laminate of the metal layers 12, the dielectric layers 13, and the absorption layers 14 extending parallel to one another, the polarizer 100 of the present embodiment can transmit a TM wave 21 (linearly polarized light that oscillates in a direction orthogonal to the extension direction of the metal layers 12), and can absorb a TE wave 22 (linearly polarized light that oscillates in the extension direction of the metal layers 12), as illustrated in FIG. 1B.

More specifically, the TE wave 22 incident on the absorption layers 14 (second grating 2) side of the substrate 11 attenuates mainly by the light absorbing effect of the absorption layers 14, and, in some cases, further attenuates in the dielectric layers 13. A part of the TE wave 22 is incident on the dielectric layers 13 without being absorbed by the absorption layers 14, and a phase difference occurs in the passage through the dielectric layers 13. The TE wave 22 through the dielectric layers 13 is reflected by the metal layers 12 (first grating 1). A phase difference also occurs in the reflected TE wave 22 in the passage through the dielectric layers 13, and the wave is attenuated by the interference effect. The remaining components are absorbed by the absorption layers 14. A desired absorptive polarization separation characteristic can be obtained by the attenuation effect of the TE wave 22.

As described above, the polarizer 100 of the present embodiment includes the absorption layers 14 (second grating 2) having high oxidation resistance in a high-temperature environment. Thus, the polarizer 100 has excellent high-temperature reliability and an excellent optical absorption characteristic.

Polarizer Producing Process

Figure 2A:
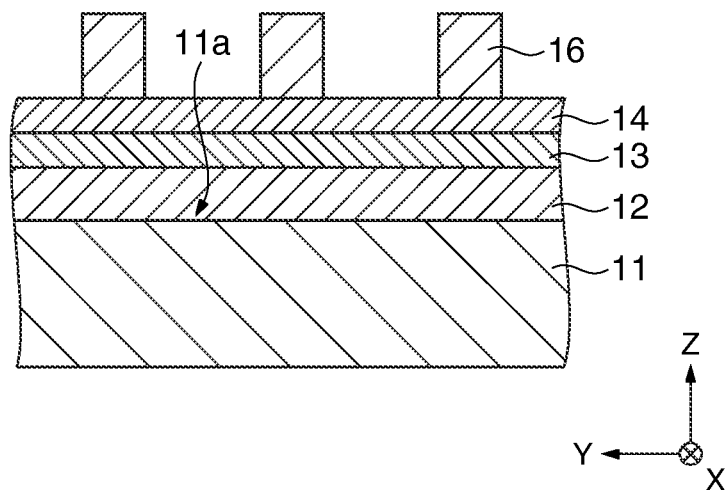
FIGS. 2A and 2B are step diagrams representing a polarizer producing process of First Embodiment.
Figure 2B:
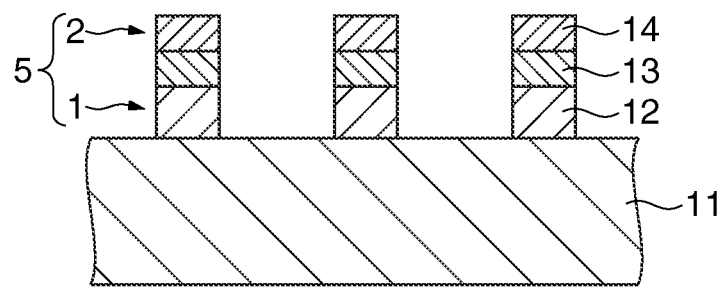

A producing process of the polarizer 100 of the present embodiment is described below. FIGS. 2A and 2B are step diagrams representing the producing process of the polarizer 100 of First Embodiment. The producing process of the polarizer 100 of First Embodiment includes generating the absorption layers 14 of the second grating 2 by reaction in a nitrogen atmosphere.

The process is described below with reference to the drawings. First, in the step of forming the metal layers 12, the dielectric layers 13, and the absorption layers 14 represented in FIG. 2A, the metal layers 12, the dielectric layer 13, and the absorption layers 14 are formed in this order on the surface 11a of the substrate 11. Specifically, an aluminum film, silicon oxide, and chromium nitride are deposited in this order on the substrate 11 by using a method such as sputtering. Then, a resist film is formed on the chromium nitride film. This is followed by the exposure and development of the resist film to form a stripe-shaped mask 16.

Specific chromium nitride deposition conditions are as follows. First, the substrate 11 is disposed in a stainless-steel container after forming the metal layers 12 and the dielectric layers 13. Then, a mixed gas of nitrogen gas and argon gas is introduced into the stainless-steel container, and the pressure inside the stainless-steel container is controlled at, for example, 0.2 Pa. Thereafter, for example, a 500 W power (DC voltage) is applied to the chromium target. As a result, a chromium nitride film having a thickness of 60 nm can generate in 3 minutes by reaction in a nitrogen atmosphere. The second grating of a chromium nitride film having excellent oxidation resistance can easily be formed with the foregoing producing process.

Next, in the dry etching step represented in FIG. 2B, the chromium nitride, the silicon oxide, and the aluminum film are etched in this order down to the surface 11a of the substrate 11, using the mask 16. After the removal of the mask 16, the laminate 5 is formed that includes the first grating 1 having the stripe-shaped metal layers 12, and the second grating 2 having the stripe-shaped absorption layers 14, as illustrated in FIG. 2B. The dielectric layers 13 are provided between the metal layers 12 and the absorption layers 14.

The polarizer 100 can be produced after these steps.

Note that, instead of the chromium nitride used for the absorption layers 14 in the present embodiment, tungsten nitride or tantalum nitride may be used for the absorption layers 14. Metal nitrides other than chromium nitride may also be deposited by reactive sputtering as above. It is also possible to use RF sputtering or vapor deposition for the metal nitride target, even though these methods are inferior to the reactive sputtering in terms of deposition speed.

Projection-Type Display Device

Figure 3:
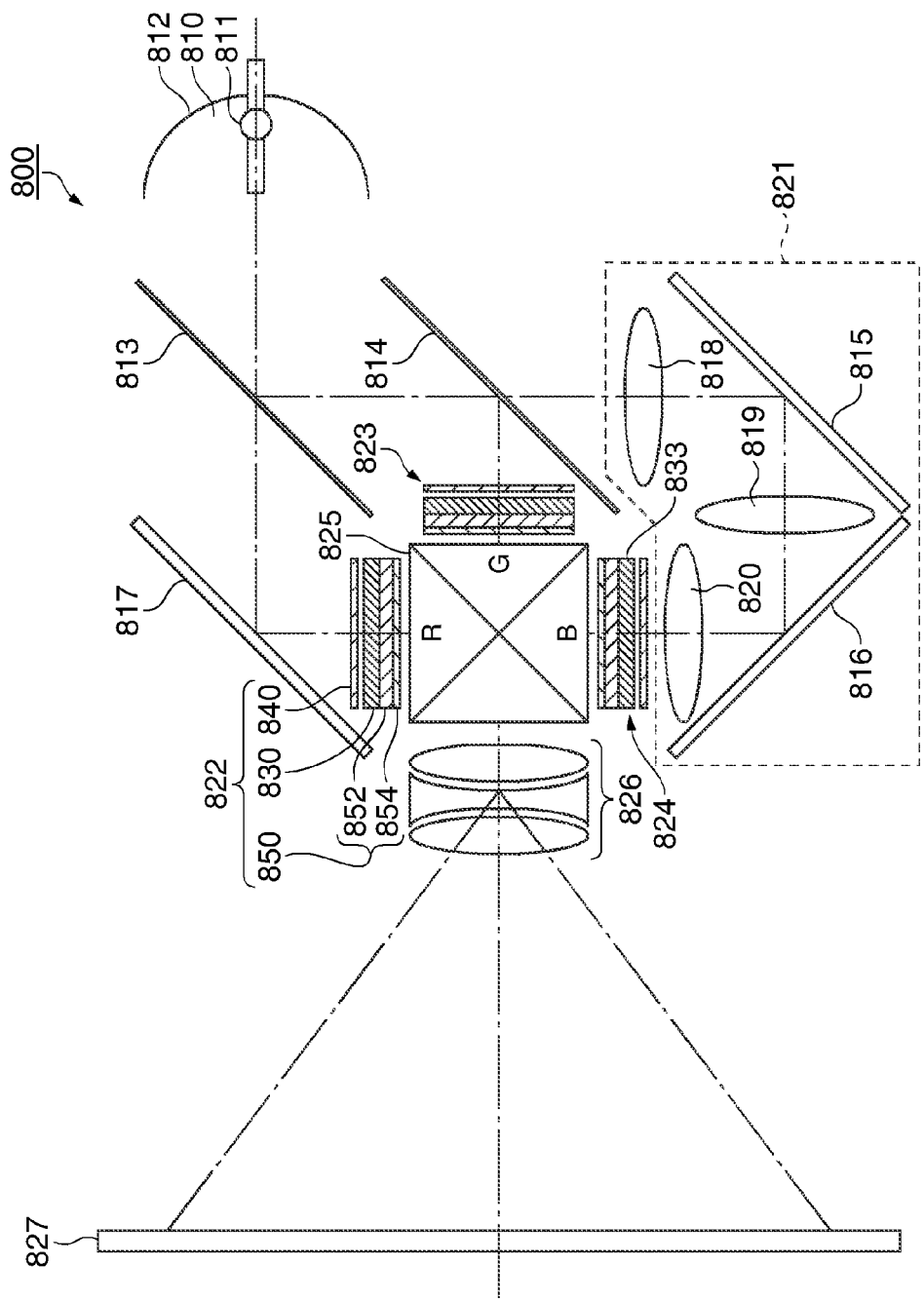
FIG. 3 is a diagram representing an embodiment of a projector.

FIG. 3 is a diagram representing an embodiment of a projector. A projector 800 illustrated in FIG. 3 includes a light source 810, a dichroic mirror 813, a dichroic mirror 814, a reflecting mirror 815, a reflecting mirror 816, a reflecting mirror 817, an incident lens 818, a relay lens 819, an exit-side lens 820, a light modulating unit 822, a light modulating unit 823, a light modulating unit 824, a cross dichroic prism 825, and a projection lens 826.

The light source 810 includes a lamp 811 realized by, for example, metal halide, and a reflector 812 that reflects light from the lamp. Other than metal halide, the light source 810 may also be realized by, for example, extra high-pressure mercury lamp, a flash mercury lamp, a high-pressure mercury lamp, a Deep UV lamp, a xenon lamp, or a xenon flash lamp.

The dichroic mirror 813 transmits the red light, and reflects the blue light and the green light in the white light from the light source 810. The red light that has passed through the dichroic mirror 813 is reflected by the reflecting mirror 817, and is incident on the light modulating unit 822 for red light. The green light in the blue and green light reflected by the dichroic mirror 813 is reflected by the dichroic mirror 814, and is incident on the light modulating unit 823 for green light. The blue light passes through the dichroic mirror 814, and is incident on the light modulating unit 824 for blue light via a relay optical system 821 that includes the incident lens 818, the relay lens 819, and the exit-side lens 820 for preventing an optical loss in the long light path.

The light modulating units 822, 823, and 824 are each provided with an incident-side polarizer 840 and an exit-side polarizing section 850 on the both sides of a liquid crystal light valve 830. The incident-side polarizer 840 is provided between the light source 810 and the liquid crystal light valve 830, on the light path of the emission light from the light source 810. The exit-side polarizing section 850 is provided between the liquid crystal light valve 830 and the projection lens 826, on the light path of the light that passes through the liquid crystal light valve 830. The incident-side polarizer 840 and the exit-side polarizing section 850 are disposed with their transmission axes orthogonal to each other (crossed Nichol).

The incident-side polarizer 840 is a reflection-type polarizer, and reflects the polarized light oscillating in a direction orthogonal to the transmission axis.

The exit-side polarizing section 850 has a first polarizer (prepolarizer) 852 and a second polarizer 854. The polarizer of First Embodiment described above is used as the second polarizer 854. The first polarizer 852 and the second polarizer 854 are both absorptive polarizers, and work together to absorb light. The polarizer of First Embodiment also may be used as the incident-side polarizer 840.

The red light, the green light, and the blue light modulated by the light modulating unit 822, the light modulating unit 823, and the light modulating unit 824, respectively, are incident on the cross dichroic prism 825. The cross dichroic prism 825 is a combination of four rectangular prisms attached to each other. A dielectric multilayer film that reflects red light, and a dielectric multilayer film that reflects blue light are formed at the interface in the shape of "X". These dielectric multilayer films combine the light of the three colors to form light that represents a color image. The combined light is projected on a screen 827 by the projection lens 826 representing a projection optical system, and an enlarged image is displayed.

Because the projector 800 configured as above uses the polarizer of the foregoing embodiment for the exit-side polarizing section 850, the deterioration of the polarizer can be suppressed even with the use of the high-output light source. The projector 800 can thus have high reliability, and excellent display characteristics.

Liquid Crystal Device

Figure 4:
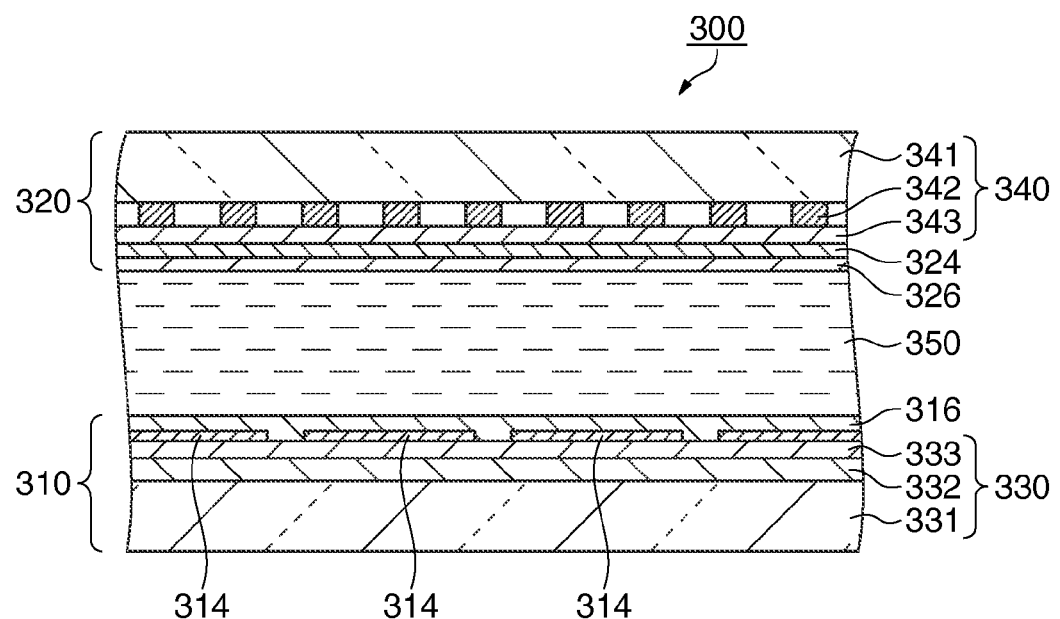
FIG. 4 is a cross sectional schematic view of a liquid crystal device that includes a polarizer according to an embodiment.

FIG. 4 is a cross sectional schematic view representing an example of a liquid crystal device 300 provided with the polarizer of the embodiment of the invention. The liquid crystal device 300 of the present embodiment is configured to include a liquid crystal layer 350 interposed between an element substrate 310 and a counter substrate 320.

The element substrate 310 includes a polarizer 330, and the counter substrate 320 includes a polarizer 340. The polarizer 330 and the polarizer 340 represent the polarizer of First Embodiment.

The polarizer 330 includes a substrate main body 331, a metal layer 332 (first grating), and a protective film 333. The polarizer 340 includes a substrate main body 341, a metal layer 342 (first grating), and a protective film 343. The dielectric layers 13 and the absorption layers 14 (second grating) are provided between the metal layer 332 and the protective film 333. However, these are omitted in FIG. 4. Likewise, the dielectric layers 13 and the absorption layers 14 (second grating) provided between the metal layer 342 and the protective film 343 are omitted in FIG. 4. In the present embodiment, the substrate main body 331 and the substrate main body 341 serve as polarizer substrates and liquid crystal device substrates at the same time. The extension direction of the metal layer 332 and the extension direction of the metal layer 342 are crossed. In each of these polarizers, the metal layer is disposed on the liquid crystal layer 350 side of the substrate main body.

Pixel electrodes 314, wires and TFT elements (not illustrated), and an alignment film 316 are provided on the liquid crystal layer 350 side of the polarizer 330. Similarly, a common electrode 324 and an alignment film 326 are provided on the inner surface side of the polarizer 340.

In the liquid crystal device configured as above, the substrate main body 331 and the substrate main body 341 serve as liquid crystal device substrates and polarizer substrates, and thus the number of components can be reduced. This makes it possible to reduce the thickness of the whole device, and improve the functionality of the liquid crystal device 300. Further, because of the simple device structure, production is easy, and costs can be reduced.

Electronic Device

Figure 5:
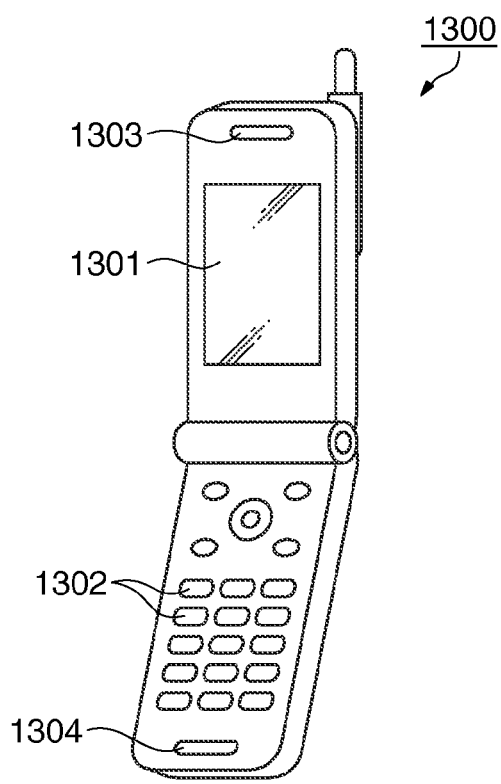
FIG. 5 is a perspective view illustrating an example of an electronic device that uses a liquid crystal device according to an embodiment.

An electronic device according to another embodiment of the invention is described below. FIG. 5 is a perspective view representing an example of an electronic device that uses the liquid crystal device illustrated in FIG. 4. A cell phone (electronic device) 1300 illustrated in FIG. 5 includes the liquid crystal device of the embodiment of the invention as a small display section 1301, and is configured from a plurality of operation buttons 1302, an ear piece 1303, and a mouthpiece 1304. The cell phone 1300 can thus have a display section that is highly reliable, and has high display quality.

Aside from the cell phone, the liquid crystal device of the embodiment of the invention also can be preferably used as an image display means of various devices such as electronic books, personal computers, digital still cameras, liquid crystal televisions, projectors, view finder-type or monitor direct view-type video cassette recorders, car navigations, pagers, electronic organizers, calculators, word processors, workstations, video phones, POS terminals, and devices provided with touch panels.

It should be noted that the invention is in no way limited to the foregoing embodiments, and may be modified in many ways, provided such modifications do not depart from the gist of the invention.

Test Production and Reliability Evaluation of High Heat-Resistance Absorption Materials In order to verify the effects of the invention, various nitride materials were evaluated for high-temperature stability. The evaluation was made for the optical properties necessary for the simulation analysis of the polarizer described later.

Example 1

A thin film of chromium nitride having a thickness of 35.0 nm was formed on a glass substrate by reactive sputtering to fabricate sample 2. The refractive index n and attenuation coefficient k of sample 2 were measured before and after heating at 300° C. for 150 hours in the atmosphere. The ellipsometric method (J. A. Woollam; M-2000) was used for the measurements of refractive index n and attenuation coefficient k. The measurement wavelength was 532 nm. The results are presented in Table 1.

Example 2

A thin film of tantalum nitride having a thickness of 48.0 nm was formed on a glass substrate by reactive sputtering to fabricate sample 4. The refractive index n and attenuation coefficient k of sample 4 were measured before and after heating at 300° C. for 150 hours in the atmosphere. The measurement results are presented in Table 1.

Example 3

A thin film of tungsten nitride having a thickness of 55.0 nm was formed on a glass substrate by reactive sputtering to fabricate sample 6. The refractive index n and attenuation coefficient k of sample 6 were measured before and after heating at 300° C. for 150 hours in the atmosphere. The measurement results are presented in Table 1.

Comparative Example 1

A thin film of copper nitride having a thickness of 35.4 nm was formed on a glass substrate by reactive sputtering to fabricate sample 1. The refractive index n and attenuation coefficient k of sample 1 were measured before and after heating at 300° C. for 150 hours in the atmosphere. The measurement results are presented in Table 1.

Comparative Example 2

A thin film of molybdenum nitride having a thickness of 35.0 nm was formed on a glass substrate by reactive sputtering to fabricate sample 3. The refractive index n and attenuation coefficient k of sample 3 were measured before and after heating at 300° C. for 150 hours in the atmosphere. The measurement results are presented in Table 1.

Comparative Example 3

A thin film of titanium nitride having a thickness of 33.0 nm was formed on a glass substrate by reactive sputtering to fabricate sample 5. The refractive index n and attenuation coefficient k of sample 5 were measured before and after heating at 300° C. for 150 hours in the atmosphere. The measurement results are presented in Table 1.

Comparative Example 4

A thin film of chromium metal having a thickness of 10.0 nm was formed on a glass substrate by sputtering to fabricate sample 7. The high-melting-point material (melting point of 1,863° C.) described in JP-A-2005-37900 was used as the chromium metal. The refractive index n and attenuation coefficient k of sample 7 were measured before and after heating at 300° C. for 150 hours in the atmosphere. The measurement results are presented in Table 1.

Table 1 presents the optical properties of the thin films before and after the heating. Even among the different nitrides, the heat resistance varied in a manner that depended on the constituent elements. These optical properties are necessary for the simulation analysis of the polarizer described below.

Thus, in the analyses below, a TM light transmittance above 80%, a TE light absorbance above 80%, a TE light reflectance below 20%, and a TE light transmittance below 0.1% before and after the heating in the atmosphere were used as the reliability criteria of the evaluations.

For the simulation analysis, the analysis software G Solver available from Grating Solver Development was used, and the shape of the polarizer, and the refractive index n and the attenuation coefficient k of the constituent materials were used as parameters.

In the structure of the polarizer 100 according to First Embodiment (FIGS. 1A and 1B), the dielectric layers 13 are laminated on the metal layers 12, and the absorption layers 14 are laminated on the dielectric layers 13. In the simulation, numerical calculations were performed by using a model in which the metal layers 12 (aluminum), the dielectric layers 13 (silicon oxide), and the absorption layers 14 were laminated in this order on the substrate.

Simulation 1

Aluminum, silicon oxide, and chromium nitride were used as the metal layers 12, the dielectric layers 13, and the absorption layers 14, respectively. The metal layers 12 had a height H1 of 152 nm and a width L of 62 nm. The dielectric layers 13 had a height H2 of 25 nm and a width L of 62 nm. The absorption layers 14 had a height H3 of 20 nm and a width L of 62 nm. The grooves 15 had a width S of 83 nm in the Y-axis direction. The period P of the metal layers 12 (or the dielectric

TABLE 1

|  | Absorption layer material | Refractive index n before heating | Attenuation coefficient k before heating | Refractive index n after heating | Attenuation coefficient k after heating | Change in refractive index n (%) | Change in Attenuation coefficient k (%) |
| --- | --- | --- | --- | --- | --- | --- | --- |
| Example 1 | Chromium nitride | 3.25 | 1.83 | 3.13 | 1.77 | −4 | −3 |
| Example 2 | Tantalum nitride | 5.29 | 2.12 | 4.65 | 2.41 | −12 | 14 |
| Example 3 | Tungsten nitride | 3.25 | 1.92 | 2.59 | 1.87 | −20 | −3 |
| Comparative Example 1 | Copper nitride | 2.54 | 1.79 | 2.81 | 0.86 | 11 | −52 |
| Comparative Example 2 | Molybdenum nitride | 3.22 | 1.62 | 1.97 | 0.44 | −39 | −73 |
| Comparative Example 3 | Titanium nitride | 2.36 | 0.97 | 2.40 | 0.00 | 2 | −100 |
| Comparative Example 4 | Chromium metal | 2.98 | 4.45 | 2.26 | 0.04 | −24 | −99 |

Evaluation of Optical Properties by Simulation Analysis

The results of the simulation analysis of the polarizer of First Embodiment are described below.

In the analysis, evaluations were performed on the assumption that the polarizer of the invention is used as a polarizer for the light valve of a liquid crystal projector. Because the polarizer of the invention is formed of inorganic material and has high heat resistance, the polarizer can be used as the exit-side polarizing plate of the foregoing liquid crystal projector having a high-output light source.

The exit-side polarizing plate needs to have high light transmittance for the TM light, and high absorbance and low light transmittance for the TE light. Specifically, a high-contrast image can be displayed when the transmittance for the TM light is above 80%, and when the absorbance and the transmittance for the TE light are above 80% and less than 0.1%, respectively. In order to prevent the TE light from reflecting at the exit-side polarizing plate and returning to the light valve, the reflectance for the TE light should be as low as possible, specifically 20% or less.

layers 13) was 145 nm. The parameters stored in the G Solver were used as the refractive index n and the attenuation coefficient k of the aluminum, and as the refractive index n and the attenuation coefficient k of the silicon oxide. The values measured with the ellipsometer before and after heating at 300° C. for 150 hours in the atmosphere were used as the refractive index n and the attenuation coefficient k of the chromium nitride. In this manner, the polarization properties of the polarizer that uses chromium nitride as the absorption layers 14 were simulated before and after the heating at 300° C.

Table 2 presents the calculated polarization properties of the polarizer before heating at 300° C. The polarization properties after the heating are presented in Table 3. The tables present the results of the simulation of the polarization separation characteristic for the TM light and TE light. In the tables, $R_{TM}$ represents the reflectance (%) of the TM light, $T_{TM}$ the transmittance (%) of the TM light, $R_{TE}$ the reflectance (%) of the TE light, $T_{TE}$ the transmittance (%) of the TE light, and $A_{TE}$ the absorbance (100-Tc-Rc (%)) of the TE light. Table 4 presents property changes before and after the heating.

Simulation 2

Simulation 2 is not different from simulation 1, except that tantalum nitride was used for the absorption layers 14, and that the thickness of the absorption layers 14 was changed to 10 nm. The values measured with the ellipsometer before and after the heating at 300° C. were used as the refractive index n and the attenuation coefficient k of the tantalum nitride. In this manner, the polarization properties of the polarizer that uses tantalum nitride as the absorption layers 14 were simulated before and after the heating at 300° C. The results are presented in Tables 2, 3, and 4.

Simulation 3

Simulation 3 is not different from simulation 1, except that tungsten nitride was used as the absorption layers 14. The values measured with the ellipsometer before and after the heating at 300° C. were used as the refractive index n and the attenuation coefficient k of the tungsten nitride. In this manner, the polarization properties of the polarizer that uses tungsten nitride as the absorption layers 14 were simulated before and after the heating at 300° C. The results are presented in Tables 2, 3, and 4.

Simulation 4

Simulation 4 was performed as a comparative example. Simulation 4 is not different from Simulation 1, except that copper nitride was used as the absorption layers 14, and that the thickness of the absorption layers 14 was changed to 35 nm. The values measured with the ellipsometer before and after the heating at 300° C. were used as the refractive index n and the attenuation coefficient k of the copper nitride. In this manner, the polarization properties of the polarizer that uses copper nitride as the absorption layers 14 were simulated before and after the heating at 300° C. The results are presented in Tables 2, 3, and 4.

Simulation 5

Simulation 5 was performed as a comparative example. Simulation 5 is not different from Simulation 1, except that molybdenum nitride was used as the absorption layers 14, and that the thickness of the absorption layers 14 was changed to 25 nm. The values measured with the ellipsometer before and after the heating at 300° C. were used as the refractive index n and the attenuation coefficient k of the molybdenum nitride. In this manner, the polarization properties of the polarizer that uses molybdenum nitride as the absorption layers 14 were simulated before and after the heating at 300° C. The results are presented in Tables 2, 3, and 4.

Simulation 6

Simulation 6 was performed as a comparative example. Simulation 6 is not different from Simulation 1, except that titanium nitride was used as the absorption layers 14, and that the thickness of the absorption layers 14 was changed to 30 nm. The values measured with the ellipsometer before and after the heating at 300° C. were used as the refractive index n and the attenuation coefficient k of the titanium nitride. In this manner, the polarization properties of the polarizer that uses titanium nitride as the absorption layers 14 were simulated before and after the heating at 300° C. The results are presented in Tables 2, 3, and 4.

Simulation 7

Simulation 7 was performed as a comparative example. Simulation 7 is not different from Simulation 1, except that chromium metal was used as the absorption layers 14, and that the thickness of the absorption layers 14 was changed to 13 nm. The values measured with the ellipsometer before and after the heating at 300° C. were used as the refractive index n and the attenuation coefficient k of the chromium metal. In this manner, the polarization properties of the polarizer that uses chromium metal as the absorption layers 14 were simulated before and after the heating at 300° C. The results are presented in Tables 2, 3, and 4.

It can be seen from Tables 2, 3, and 4 that the changes in the polarization properties of the chromium nitride, tungsten nitride, and the tantalum nitride, in particular, are not as large as the changes in the polarization properties of the high-melting-point materials such as chromium metal, copper nitride, molybdenum nitride, and titanium nitride even after the heating at 300° C. for 150 hours in the atmosphere, and remain stable even in a 300° C. atmospheric environment. The small polarization property changes in these three nitrides are believed to be due to the extremely slow progression of the oxidation. It can therefore be said that these nitrides maintain preferable properties even in a high-temperature environment. The chromium metal and the copper nitride did not satisfy the reliability criteria before heating at 300° C., and are thus not applicable to absorptive polarizers.

TABLE 2

| | Absorption layer | Absorption layer/ SiO$_2$ (nm) | R$_{TM}$ (%) | T$_{TM}$ (%) | R$_{TE}$ (%) | T$_{TE}$ (%) | A$_{TE}$ (%) |
|---|---|---|---|---|---|---|---|
| Example 1 | Chromium nitride | 20/25 | 1.4 | 82.4 | 7.6 | 9.3E−05 | 92.4 |
| Example 2 | Tantalum nitride | 10/25 | 2.1 | 86.4 | 4.3 | 9.2E−05 | 95.7 |
| Example 3 | Tungsten nitride | 20/25 | 1.4 | 82.2 | 8.8 | 8.9E−05 | 91.2 |
| Comparative Example 1 | Copper nitride | 35/25 | 0.5 | 76.6 | 9.9 | 6.2E−05 | 90.1 |
| Comparative Example 2 | Molybdenum nitride | 25/25 | 0.9 | 82.3 | 4.6 | 7.9E−05 | 95.4 |
| Comparative Example 3 | Titanium nitride | 30/25 | 1.4 | 81.2 | 7.7 | 1.4E−04 | 92.3 |
| Comparative Example 4 | Chromium metal | 13/25 | 1.2 | 81.9 | 43.7 | 6.8E−05 | 56.3 |

TABLE 3

| | Absorption layer | Absorption layer/SiO$_2$(nm) | R$_{TM}$ (%) | T$_{TM}$ (%) | R$_{TE}$ (%) | T$_{TE}$ (%) | A$_{TE}$ (%) |
|---|---|---|---|---|---|---|---|
| Example 1 | Chromium nitride | 20/25 | 1.5 | 82.1 | 8.1 | 1.0E−04 | 91.9 |
| Example 2 | Tantalum nitride | 10/25 | 2.2 | 85.2 | 8.8 | 1.0E−04 | 91.2 |
| Example 3 | Tungsten nitride | 20/25 | 1.8 | 80.5 | 17.6 | 1.1E−04 | 82.4 |
| Comparative Example 1 | Copper nitride | 35/25 | 0.6 | 83.3 | 0.7 | 1.1E−04 | 99.3 |
| Comparative Example 2 | Molybdenum nitride | 25/25 | 2.7 | 84.8 | 46.4 | 2.4E−04 | 53.6 |
| Comparative Example 3 | Titanium nitride | 30/25 | 1.7 | 90.2 | 78.4 | 3.9E−04 | 21.6 |
| Comparative Example 4 | Chromium metal | 13/25 | 3.7 | 88.3 | 82.0 | 3.0E−04 | 18.0 |

TABLE 4

| | Absorption layer | Absorption layer/SiO$^2$(nm) | R$_{TM}$ (%) | T$_{TM}$ (%) | R$_{TE}$ (%) | T$_{TE}$ (%) | A$_{TE}$ (%) |
|---|---|---|---|---|---|---|---|
| Example 1 | Chromium nitride | 20/25 | 0.1 | −0.3 | 0.5 | 7.2E−06 | −0.5 |
| Example 2 | Tantalum nitride | 10/25 | 0.1 | −1.2 | 4.5 | 1.1E−05 | −4.5 |
| Example 3 | Tungsten nitride | 20/25 | 0.5 | −2.7 | 8.8 | 2.3E−05 | −8.8 |
| Comparative Example 1 | Copper nitride | 35/25 | 0.1 | 6.7 | −9.2 | 4.9E−05 | 9.2 |
| Comparative Example 2 | Molybdenum nitride | 25/25 | 1.8 | 2.5 | 41.7 | 1.6E−04 | −41.8 |
| Comparative Example 3 | Titanium nitride | 30/25 | 0.4 | 9.0 | 70.7 | 2.5E−04 | −70.7 |
| Comparative Example 4 | Chromium metal | 13/25 | 2.5 | 6.4 | 38.3 | 2.3E−04 | −38.3 |

In the foregoing examples, the second grating (absorption layers) was described as containing any one of chromium nitride, tungsten nitride, and tantalum nitride. However, the invention is not limited to this, and the second grating (absorption layers) may contain two or more materials selected from chromium nitride, tungsten nitride, and tantalum nitride.

Further, in the foregoing examples, the first grating is provided on the surface 11a of the substrate 11, and the second grating is provided on the upper layer of the first grating. However, the invention is not limited to this, and the first grating may be provided on the upper layer of the second grating.

Further, in the foregoing examples, the first grating and the second grating are provided on the surface 11a of the substrate 11. However, the invention is not limited to this, and the first grating may be provided on the surface 11a of the substrate 11, and the second grating may be provided on the surface of the substrate 11 opposite from the surface 11a.

As described above, because the second grating (absorption layers) contains at least one of chromium nitride, tungsten nitride, and tantalum nitride, an absorptive polarizer can be realized that does not undergo serious deterioration of the polarization properties even when used under high temperatures, and that has a desirable absorption characteristic.

The entire disclosure of Japanese Patent Application No. 2011-248285, filed on Nov. 14, 2011 is expressly incorporated by reference herein.

What is claimed is:

1. A polarizer comprising:
a substrate;
a first grating provided on the substrate and that is stripe-shaped in planar view; and
a second grating that is provided over the first grating and that is stripe-shaped in planar view, and that extends in the extension direction of the first grating,
wherein the first grating is made of a light reflecting material,
the second grating is made of a light absorbing material,
the second grating contains at least one of chromium nitride, tungsten nitride, and tantalum nitride,
the first grating and the second grating form a portion of a laminate, and
a layer disposed between the first grating and the second grating, wherein the layer is configured and arranged to prevent interdiffusion between a constituent element of the first grating and a constituent element of the second grating.

2. The polarizer according to claim 1, wherein the layer between the first grating and the second grating is a dielectric.

3. The polarizer according to claim 1, wherein the pitch of the first grating, and the pitch of the second grating are shorter than the wavelengths of visible light.

4. A process for producing a polarizer that includes a substrate; a first grating provided on the substrate and that is stripe-shaped in planar view; and a second grating that is provided over the first grating and that is stripe-shaped in planar view, and that extends in the extension direction of the first grating, and a layer is disposed between the first grating and the second grating, wherein the layer is configured and arranged to prevent interdiffusion between a constituent element of the first grating and a constituent element of the second grating, wherein the first grating is made of a light reflecting material, the second grating is made of a light absorbing material, the second grating contains at least one of chromium nitride, tungsten nitride, and tantalum nitride, and the first grating and the second grating form a laminate, and the process comprising generating the second grating by reaction in a nitrogen atmosphere.

5. A projector comprising:
an illumination optical system that emits light;
a liquid crystal light valve that modulates the light; and
a projection optical system that projects light modulated by the liquid crystal light valve,
wherein the polarizer of claim 1 is provided between the liquid crystal light valve and the illumination optical system, and/or between the liquid crystal light valve and the projection optical system.

6. A projector comprising:
an illumination optical system that emits light;
a liquid crystal light valve that modulates the light; and
a projection optical system that projects light modulated by the liquid crystal light valve,
wherein the polarizer of claim 1 is provided between the liquid crystal light valve and the illumination optical system, and/or between the liquid crystal light valve and the projection optical system.

7. A projector comprising:
an illumination optical system that emits light;
a liquid crystal light valve that modulates the light; and
a projection optical system that projects light modulated by the liquid crystal light valve,
wherein the polarizer of claim 2 is provided between the liquid crystal light valve and the illumination optical system, and/or between the liquid crystal light valve and the projection optical system.

8. A projector comprising:
an illumination optical system that emits light;
a liquid crystal light valve that modulates the light; and
a projection optical system that projects light modulated by the liquid crystal light valve,
wherein the polarizer of claim 3 is provided between the liquid crystal light valve and the illumination optical system, and/or between the liquid crystal light valve and the projection optical system.

9. A liquid crystal device comprising:
a liquid crystal layer between a pair of substrates; and
the polarizer of claim 1 on the liquid crystal layer side of at least one of the pair of substrates.

10. A liquid crystal device comprising:
a liquid crystal layer between a pair of substrates; and
the polarizer of claim 1 on the liquid crystal layer side of at least one of the pair of substrates.

11. A liquid crystal device comprising:
a liquid crystal layer between a pair of substrates; and
the polarizer of claim 2 on the liquid crystal layer side of at least one of the pair of substrates.

12. A liquid crystal device comprising:
a liquid crystal layer between a pair of substrates; and
the polarizer of claim 3 on the liquid crystal layer side of at least one of the pair of substrates.

13. An electronic device comprising the liquid crystal device of claim 9.

14. An electronic device comprising the liquid crystal device of claim 10.

15. An electronic device comprising the liquid crystal device of claim 11.

16. An electronic device comprising the liquid crystal device of claim 12.

17. The polarizer according to claim 1, wherein the first grating is thicker than the second grating.

18. The process according to claim 4, wherein the first grating is thicker than the second grating.

19. The polarizer according to claim 1, wherein at least some light incident on the second grating is reflected back through the second grating by the first grating.

20. The polarizer according to claim 1, wherein the layer between the first grating and the second grating exhibits high light transmittance in the visible range.

21. The process according to claim 4, wherein the layer disposed between the first grating and the second grating is a dielectric.

* * * * *